Patented June 8, 1926.

1,587,679

UNITED STATES PATENT OFFICE.

GEORGE A. RICHTER AND SANFORD L. SWASEY, OF BERLIN, NEW HAMPSHIRE, ASSIGNORS TO BROWN COMPANY, OF BERLIN, NEW HAMPSHIRE, A CORPORATION OF MAINE.

PROCESS OF RECOVERING CALCIUM CARBONATE FROM CAUSTIC LIQUORS.

No Drawing.   Application filed January 17, 1924.   Serial No. 686,929.

This invention has relation to reclaiming, for industrial uses, certain waste products resulting from the manufacture of chemical wood pulp wherein the chips are subjected to the action of an alkaline cooking liquor.

In preparing the cooking liquor wherein the smelted residuum of the black liquor is employed in preparing a fresh batch of alkaline liquor, the sodium is recovered as sodium carbonate and dissolved in an aqueous solution (together with sodium sulphide if the "sulphate" process be employed), and is then causticized by the addition of lime. The resulting calcium carbonate or "lime sludge", from which the solution is filtered, usually is wasted as having no commercial value because of the admixture therewith of various impurities. It is ordinarily of a gray-green or light brown color, and cannot be used where a white or light-colored calcium carbonate is desirable.

The object of the present invention is to recover the calcium carbonate in such condition that it is commercially available for use as "whiting", or as a filler for rubber compounds, or for other uses in the arts. In the rubber industry, for example, a white or very light-colored carbonate, which is finely divided so that approximately 99% will pass through a 200-mesh sieve, is used in large quantities, but the product must be fairly free from alkali or excess lime and from flint, quartz or other grit. We have discovered that it is possible to recover calcium carbonate from the causticizing cooking liquor in such condition that it may conform to the desired characteristics of a filler in the rubber industry.

It may be stated that the molten effluent from the retort, in which the black liquor is consumed and the inorganic content smelted, is delivered to a dissolving tank containing water or alkaline water. This dissolving tank liquor, containing the sodium compounds in solution, is green in color;—due to the presence of unconsumed organic matter, inorganic compounds of iron, manganese, nickel, cobalt or other minerals,—and other impurities, of which some are undoubtedly colloidal. When lime is added to the solution with the consequent formation of calcium carbonate, the latter has admixed therewith the impurities when the liquor is subjected to the usual filtration.

We have found that it is possible to recover the calcium carbonate in a white or very light-colored state by first removing from the solution which contains the sodium carbonate more or less of the impurities contained therein before such liquor is subjected to the major causticization with lime. It is possible to remove some of the impurities by filtering the dissolving tank liquor, but those impurities which are colloidal do not respond to filtration. If, however, the causticization be accomplished in two stages or steps, the coloring matter can be concentrated in the first precipitation, and the calcium carbonate precipitated in the second stage or step will be substantially free from coloring matter. That is to say, we add to the green dissolving tank liquor (the solution containing sodium carbonate and the coloring impurities) say from 5% to 10% of the total amount of lime required for its complete causticization, and the precipitated calcium carbonate carries with it the impurities, so that the entire insoluble matter can be filtered out leaving a clean solution. This precipitate is very dark green,—almost black,—in color and may be wasted with inconsequent loss since it amounts to only 5% to 10% of the total calcium carbonate. When the clean filtrate, which is now more or less yellow, is subjected to causticization with the required amount of lime and the precipitated calcium carbonate is filtered out and dried, the precipitate is very light-colored, free from grit and very finely divided, and is available as a filler for vulcanizable rubber compounds.

If the lime for the major or final step of causticization is carefully selected, a white precipitate may be secured. For example, if chemically pure calcium oxide be employed, the precipitate is absolutely white; whereas commercial lime, because of its contained impurities, will result in a somewhat colored precipitate. Since chemically pure lime is too expensive for commercial use, we preferably employ commercial lime and subject it to a cleansing operation before using it in the causticizing tanks. Any suitable operation may be practiced, but, for practical purposes, we first slake the lime, and then pass the milk of lime through an 80-mesh to 150-mesh sieve, which has the effect of removing a quantity of granular, gritty and dark-colored materials or impurities. While the calcium carbonate precipitated by the use of the cleansed commercial lime is not pure white, it is of a better color than the high grade pulverized chalk imported from England. Of course other methods of freeing commercial lime from coloring impurities may be practiced if desired.

Where an absolutely white color is required in the calcium carbonate, precipitated from the treated commercial lime, this may be secured by bleaching the precipitate with a small quantity of an oxidizing agent such as gaseous chlorine or bleach liquor, which results in oxidizing the residual traces of the iron or other compounds present in the mass.

By practicing the procedure herein outlined, which is inexpensive to perform, we are able to recover the calcium carbonate in either a white or else a very light-colored state (depending on the lime used for causticization) substantially free from alkali, lime and grit, and in a form which makes it available for many industrial uses, and thus to convert into a valuable material a substantially valueless by-product.

The process herein outlined is available for practice in connection with the liquors resulting from the recovery of sodium compounds in either the "soda" or "sulphate" production of chemical wood pulp.

The precipitated and recovered calcium carbonate, which is white, or substantially white for all practical purposes, is dried and packed for shipment in suitable containers.

Instead of removing the impurities of the dissolving tank liquor (containing sodium carbonate) by forming a calcium precipitate of a small portion of the contained sodium carbonate by the addition of lime, calcium carbonate may be added to and stirred into the dissolving tank liquor. In this case a portion of the calcium carbonate, which is recovered in the second step of the process, may be employed; or any other suitable coagulating agent for the coloring matter may be employed for freeing the dissolving tank liquor from coloring impurities prior to the ultimate causticization of the liquor with lime.

What we claim is:—

1. Subjecting the solution of smelted sodium compounds recovered from black liquor to the action of lime, insufficient to causticize the entire solution, removing the precipitate, causticizing the remaining solution with lime, and recovering the precipitate.

2. Removing the coloring impurities from a solution of the smelted sodium compounds recovered from evaporated and concentrated black liquor, then causticizing the remaining solution with lime, and recovering the resulting precipitate substantially free from coloring matter.

3. A process such as herein described, comprising causticizing and precipitating out as calcium carbonate and removing, from a solution of sodium carbonate containing coloring impurities, a small portion of the sodium carbonate and thereby removing coloring impurities, leaving a clean solution, then causticizing the solution with lime to form a white or light-colored calcium carbonate precipitate, and recovering said precipitate in substantially pure form.

4. A process such as herein described, comprising causticizing and precipitating out as calcium carbonate and removing, from a solution of sodium carbonate containing coloring impurities, a small portion of the sodium carbonate and thereby removing coloring impurities, leaving a clean solution, then causticizing the solution with lime substantially free from coloring impurities, whereby a light-colored calcium carbonate is precipitated, and removing and recovering such precipitate.

5. A process such as herein described, comprising causticizing and precipitating out as calcium carbonate and removing, from a solution of sodium carbonate containing coloring impurities, a small portion of the sodium carbonate and thereby removing coloring impurities, leaving a clean solution, then causticizing the solution with lime substantially free from coloring impurities, whereby a white calcium carbonate is precipitated, filtering out and removing the precipitate, and subjecting the same to the action of an oxidizing agent to remove any traces of color left therein.

6. A process, such as herein described, which comprises removing, from liquor containing the smelted sodium compounds of evaporated and concentrated black liquor, coloring impurities by a coagulating agent, then causticizing such liquor with lime, and then recovering and drying the precipitate.

7. A process, such as herein described, which comprises removing, from liquor containing the smelted sodium compounds of black liquor, coloring impurities by finely-divided calcium carbonate, then causticizing such liquor with lime, and then filtering out and drying the precipitate.

In testimony whereof we have affixed our signatures.

GEORGE A. RICHTER.
SANFORD L. SWASEY.